July 21, 1953 A. D. COGGESHALL ET AL 2,646,535
ELECTRICAL COIL
Filed Sept. 28, 1949
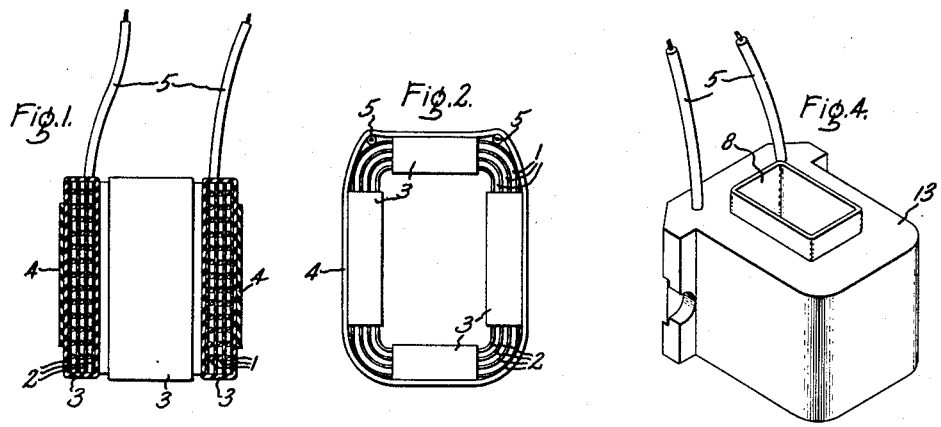
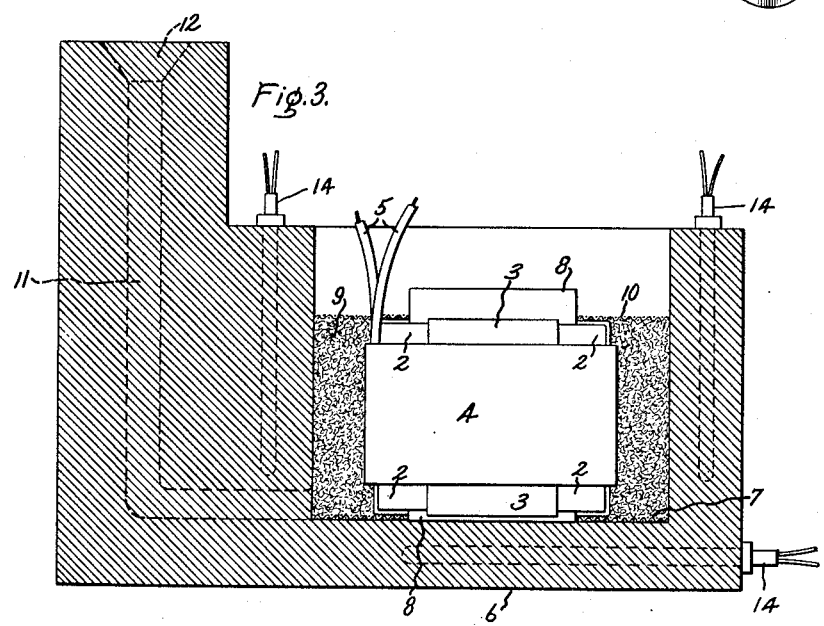
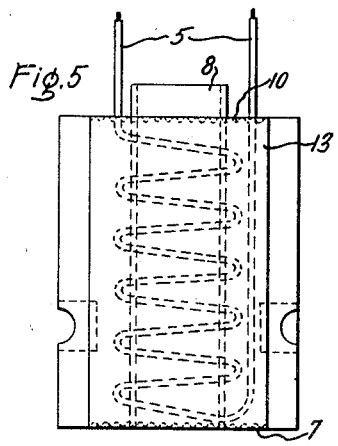
Inventors:
Almy D. Coggeshall,
Andrew H. Caldwell,
by Claude A. Mott.
Their Attorney.

Patented July 21, 1953

2,646,535

UNITED STATES PATENT OFFICE 2,646,535

ELECTRICAL COIL

Almy D. Coggeshall, Schenectady, and Andrew H. Caldwell, Ballston Lake, N. Y., assignors to General Electric Company, a corporation of New York Application September 28, 1949, Serial No. 118,224

5 Claims. (Cl. 317—226)

This invention relates to coils for electrical devices, and to methods of making such coils. More particularly, the invention relates to coils which are embedded in reinforced plastic material to provide electrical insulation for the coil along with desirable physical properties.

The most highly penetrative of plastic forming materials are those which utilize a solvent to maintain the resins or other basic materials in solution. While these solutions are readily forced into the interstices of wound coils and insulating and reinforcing material associated therewith in order to impregnate such coils, there is great difficulty in forming a jacket of plastic material around a coil, if such solutions are used, particularly if reinforcing material is necessary, because it must be applied to the coil in a multitude of successive coatings, each of which must be dried before the succeeding one may be applied. Furthermore, such a process does not result in a final covering of definite shape, and this is often desirable for mechanical reasons.

If it is desired to provide a coil with a plastic jacket by molding, and the coil is placed within a mold along with fibrous reinforcing material and the mold filled with plastic-producing materials including a solvent, considerable time and effort is required to get rid of the solvent; and when it is finally expelled and the plastic material is cured, the mass of plastic material is usually considerably cracked and honeycombed, due to the shrinkage caused by the expulsion of the solvent from the mass.

Attempts have been made to use solventless varnishes, or polyester resins to provide reinforced plastic jackets for electrical coils, but these have been largely unsuccessful, due to the fact that the resins did not penetrate sufficiently the reinforcing material, thus leaving large and unsightly voids.

If the reinforcing material can be omitted, the problem is considerably less difficult, but generally the reinforcing material cannot be omitted. If the coil is to be subject to vibration, for example, reinforcing of the plastic jacket is mandatory because plastic materials will not withstand such stresses. Another possibility for producing a reinforced plastic enclosed coil is the use of pressure molding to force the resins into the interstices of the coil and reinforcing material, but at conventional molding pressures this generally results in distorting the coil or displacing the reinforcing material, or both.

It is an object of our invention to provide a reinforced plastic insulated coil having high mechanical strength and good electrical insulating properties, with the plastic material penetrating all interstices of the reinforcing material so that there are no voids to induce electrical or physical failure.

Another object of the invention is to provide such a coil which may be readily and inexpensively produced in large quantities by pressureless molding, or casting.

A still further object of the invention is the provision of a reinforced plastic jacket for electrical coils which may be readily formed in a variety of complex useful and attractive shapes to conform to specific uses for such coils.

In carrying out our invention in one form, we provide a preformed coil composed of a plurality of turns of a conductor having interturn and interlayer insulation, which is inserted in a mold, or die having a shape corresponding to the desired final shape of the enclosed coil. A tube of laminated glass cloth is inserted in the coil to provide a longitudinal opening through the enclosed coil. The outer space between the coil and the mold is substantially filled with a mat of glass fibers. A pair of washers of woven glass cloth are placed, respectively at the ends of the coil, one being placed on the bottom of the mold before the coil is inserted and the other being added after the mat of glass fibers is put in position. Then the mold is filled by gravity flow with a polymerizable resinous liquid of the type having great fluidity under initial formative conditions and which cures into a slightly flexible solid mass upon polymerization. The liquid substantially fills all interstices of the reinforcing material and upon polymerization produces a void-free plastic enclosed coil of the desired shape with relatively great physical strength.

For a more complete understanding of our invention, reference should be had to the accompanying drawing, Fig. 1 of which is a cross-sectional end elevation view of a coil which is ready to be provided with a reinforced plastic jacket in accordance with our invention; Fig. 2 is a top view of the coil of Fig. 1; Fig. 3 is a schematic sectional view of an apparatus for forming coils; Fig. 4 is a perspective view of a completed coil formed in accordance with our invention; while Fig. 5 is an elevation view of a modified embodiment of the invention.

Any suitable liquid polymerizable material having sufficiently low viscosity may be employed and we have found it desirable to use a material which is free from or substantially devoid of the conventional inert volatile solvents such, for instance, as are employed in the conventional alkyd or phenolic type resinous solutions. A suitable material which we have advantageously employed in the practice of our invention comprises a liquid having the following formulation:

60% diethylene glycol maleate
24% methyl methacrylate
8% diallyl phthalate
8% styrene A liquid of this composition has a viscosity of approximately 40 centipoises and we have found this viscosity to be suitable for many types of coils. However, it will be readily understood by those skilled in the art that the percentages given above may be varied in order to increase or decrease the viscosity of the liquid to meet the requirements of a particular coil. Other examples of polymerizable liquids suitable for forming plastic enclosed coils in accordance with our invention may be found in Patents 2,443,736 through 2,443,741, all of which were granted to Edward L. Kropa on June 22, 1948. The composition of the specific example and of the resinous compositions described in the Kropa patents (which constitute part of the disclosure hereof) are resinous compositions comprising an unsaturated alkyl resin and a vinyl monomer. The alkyd resin of the specific example is diethylene glycol maleate, the other constituents of the specific example being vinyl monomer compounds.

Referring to Fig. 1 of the drawing, there is shown a sectional view of a typical coil which may be advantageously provided with a jacket of plastic material in accordance with our invention. This preformed coil is composed of a plurality of turns of a conductor 1. Inter-turn insulation within the coil is provided by the space between turns, while interlayer insulation is provided by layers 2, which may be of paper or other suitable material. After being wound, the coil is preferably provided with a layer 3 of varnished cambric tape or other similar material, as best seen in Fig. 2, on each of the four sides of the substantially rectangular coil to retain the winding and interlayer insulation in the correct position. Further support is provided by an additional layer 4, also of varnished cambric tape or other similar material, which is positioned perimetrically around the coil. A pair of insulated leads 5 are joined to the ends of the winding 1 to provide for electrical connections thereto.

In order to provide the coil with a reinforced plastic jacket, the coil is inserted in a mold 6, such as that shown in Fig. 3, after a washer 7 of woven reinforcing material has been placed on the bottom of the mold. Washer, or layer 7 is preferably of loosely woven glass cloth, although other materials having similar properties may also be used. A preformed tube 8 of rectangular cross section made of glass cloth laminated with a resinous material is placed in the center of the coil to provide additional insulation between the coil and ground and to serve as a guide for moving parts, which may be required to move within the coil. Washer 7 is provided with an opening below tube 8 so that the tube rests directly on mold 6 during the subsequent casting process and produces a longitudinal opening in the finished enclosed coil through tube 8. The coil illustrated is for use in a solenoid having a rectangular plunger, and the tube 8 is of rectangular cross section to accommodate this plunger; however, a tube of any desired cross section may be used. Furthermore, tube 8 may be omitted in some cases, particularly if there will be no moving parts within the coil. The coil is centered within the mold and the space between the outside of the coil and the mold is filled with a mat 9 of fibrous material, preferably of glass fibers. A washer 10 of loosely woven glass cloth or other suitable material, similar to washer 7, is placed on top of the coil and mat 9 and around tube 8; although both washers 7 and 10 may be omitted, in some cases, if desired.

The mold, or die 6 is then filled with a polymerizable resin composition of the type previously described to a point just above washer 10. By the use of polymerizable materials having sufficiently great fluidity in the initial formative stages, the mold may be filled by gravity utilizing conduit 11, with the funnel opening 12 at the entrance thereof. The use of such gravity casting with upward flow of liquid in the mold is very advantageous because there is much less likelihood of displacing the reinforcing elements or distorting the coil than if pressure molding were used. As the filling of the mold through the conduit 11 is begun at the bottom, and the filling of the mold spaces continues upwardly, trapping of air in the resin is avoided and displaced air may escape from the top opening of the mold. Thus, it is possible to produce around the coil by a single casting operation a plastic jacket 13, as shown in Fig. 4, having the reinforcing mat 9 of glass fibers distributed substantially uniformly through the jacket perimetrically around the outermost turns of the coil to provide maximum strength. The coil illustrated in Fig. 4, which is for a solenoid, is typical of the plastic enclosed coils which may be produced by the use of our invention in a variety of useful and attractive shapes.

When properly compounded, the polymerizable materials mentioned above are of very low viscosity in the initial formative stages and, thus, penetrate all interstices of mat 9 and washers 7 and 10 and completely embed these elements within the plastic jacket. These materials also combine with the resinous laminating material in tube 8 so as to bond the plastic jacket 13 to the tube 8, thus forming a unitary structure around the coil when the plastic jacket has been cured. It is desirable also to compound these resins so that they cure to produce a tough, slightly flexible solid, as compared to the glass-hard types resulting from the use of other polyester resins, and it is our practice to add a substantial amount of talc, such as 20% for example, to the resin to aid in achieving this result. This is very advantageous because the plastic enclosed coils, being less brittle, are less susceptible to breaking or cracking.

The polymerizable liquid is polymerized and caused to solidify in the mold by the action of activators put into the mixture before it is put into the mold, or by the application of heat, or a combination of both. Ascorbic acid is one suitable activator, although others may be used. Heat may be applied to the liquid while it is in the mold by means of electrical heating units 14 embedded in the mold structure.

A modified embodiment of our invention is illustrated in Fig. 5 on the accompanying drawing. In this embodiment, coil 1 is made up of a conductor which is uninsulated prior to casting except by the spaces between turns, the conductor of which the coil is made being sufficiently rigid that the coil is self-supporting when placed in the mold. In this embodiment, the resin flows in and around the winding 1 and completely embeds it, so that the resin provides interturn insulation for the winding, in addition to the other features previously mentioned.

While we have illustrated and described a preferred embodiment of our invention, together with one modification, additional modifications thereof will occur to those skilled in the art; therefore, it should be understood that we intend to cover, by the appended claims, all such modifications as fall within the true spirit and scope of our invention.

What we claim as new and desire to secure by Letters Patent of the United States is:

1. An electrical coil structure comprising a plurality of turns of a conductor having a longitudinal opening therethrough, a mat of glass fiber reinforcing material positioned perimetrically around the outermost of said turns, a tubular woven glass fiber reinforcing member laminated with resinous material positioned within said turns and defining an opening therethrough, a pair of glass cloth reinforcing members adjacent respectively the endmost of said turns, and a slightly flexible mass of resin composition comprising the polymerized product of unsaturated alkyd resin and vinyl monomer embedding all of the said foregoing components except said tubular member and substantially filling all interstices in said mat and said pair of reinforcing members, said mass being bonded to said inner tubular member whereby a unitary structure is formed completely enclosing said conductor turns.

2. A plastic enclosed electrical coil comprising a plurality of turns of an electrical conductor forming an elongated coil, a mat of fibrous glass reinforcing material perimetrically positioned around said turns, and a slightly flexible mass of material comprising the product of polymerization of a mixture of diethylene glycol maleate, methyl methacrylate, diallyl phthalate and styrene embedding said conductor and said reinforcing material and substantially filling all interstices in said reinforcing material whereby a unitary structure substantially free of voids is formed.

3. An insulated electrical coil comprising a winding of conductive material, a mat of fibrous reinforcing material around said winding, a woven reinforcing member having a longitudinal opening therethrough positioned within said winding and defining an opening therethrough, a pair of substantially flat woven reinforcing members having apertures therein to provide for said opening positioned adjacent respectively the ends of said winding, and a mass of polymerized mixture of diethylene glycol maleate, methyl methacrylate, diallyl phthalate and styrene completely embedding the said foregoing component parts except for said first woven reinforcing member and substantially filling all interstices in said layer of fibrous reinforcing material and said pair of reinforcing members, said insulating material being of the type of polymerizable resinous materials having relatively great fluidity in the initial formative stages which cures to a slightly flexible solid.

4. An electrical coil structure comprising an elongated preformed multi-turn insulated winding of substantially rectangular cross section having two outwardly extending terminal leads, a preformed tube of substantially rectangular cross section of glass cloth laminated with a polyester resin positioned within said winding and defining an opening therethrough to provide added insulation from ground potential on the inside of the winding and provide a guide and bearing surface for moving parts within the opening formed in the coil structure by said tube, a mat of reinforcing glass fibers around said winding, a plurality of substantially flat reinforcing washers of loosely woven glass cloth adjacent the ends of said winding positioned with the planes of the washers substantially perpendicular to the axis of said winding, and a mass of insulating material completely embedding all of the said foregoing component parts except a portion of said terminal leads and said tube and substantially filling all interstices in said mat and said washers, said insulating material being formed by polymerizing a mixture of diethylene glycol maleate, methyl methacrylate, diallyl phthalate and styrene to which a substantial portion of talc has been added, said mixture having relatively great fluidity in the initial formative stages and curing to a slightly flexible solid, said polymerized material being bonded to said tube to form a substantially void-free unitary structure completely enclosing said winding.

5. An electrical coil structure comprising the combination of a plurality of turns of a conductor having a longitudinal opening therethrough, a mat of glass fiber reinforcing material positioned perimetrically around the outermost of said turns, a tubular woven glass fiber reinforcing member laminated with resinous material positioned within said turns and defining an opening therethrough, a pair of glass cloth reinforcing members of washer-like form, encircling respectively the endmost of said turns, and extending outwardly, and a slightly flexible mass of resin composition comprising the polymerized product of unsaturated alkyl resin and vinyl monomer embedding all of the said foregoing components except said tubular member and substantially filling all interstices in said mat and said pair of reinforcing members, said mass being bonded to said inner tubular member whereby a unitary structure is formed completely enclosing said conductor turns.

ALMY D. COGGESHALL.
ANDREW H. CALDWELL.

References Cited in the file of this patent

UNITED STATES PATENTS

| Number | Name | Date |
| --- | --- | --- |
| 1,326,366 | Milton | Dec. 20, 1919 |
| 1,888,275 | Larsen | Nov. 22, 1932 |
| 2,116,318 | Miles | May 3, 1938 |
| 2,183,550 | Deutschmann | Dec. 19, 1939 |
| 2,476,455 | Rousch | July 19, 1949 |
| 2,479,400 | Pecoroni | Aug. 16, 1949 |
| 2,506,446 | Dubilier | May 2, 1950 |
| 2,559,141 | Williams | July 3, 1951 |

FOREIGN PATENTS

| Number | Country | Date |
| --- | --- | --- |
| 597,218 | Great Britain | Jan. 21, 1948 |